(12) United States Patent
Denner et al.

(10) Patent No.: US 9,441,763 B2
(45) Date of Patent: Sep. 13, 2016

(54) FASTENING DEVICE FOR FIXING A CABLE (71) Applicant: Continental Teves AG & Co. oHG, Frankfurt (DE)

(72) Inventors: Timo Denner, Bretzfeld (DE); Tobias Musolf, Hofheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/412,486

(22) PCT Filed: Jun. 28, 2013

(86) PCT No.: PCT/EP2013/063662
§ 371 (c)(1),
(2) Date: Jan. 2, 2015

(87) PCT Pub. No.: WO2014/005945
PCT Pub. Date: Jan. 9, 2014

(65) Prior Publication Data
US 2016/0003377 A1    Jan. 7, 2016

(30) Foreign Application Priority Data

Jul. 4, 2012    (DE) .................. 10 2012 013 210
Dec. 21, 2012   (DE) .................. 10 2012 224 173

(51) Int. Cl.
*F16B 2/20*      (2006.01)
*F16L 3/10*      (2006.01)
(Continued)

(52) U.S. Cl.
CPC .......... *F16L 3/1075* (2013.01); *B60R 16/0215* (2013.01); *F16L 3/1025* (2013.01);
(Continued)

(58) Field of Classification Search
USPC .............. 248/71, 70, 73, 74.2, 74.5, 226.12, 248/230.6, 230.7, 231.71, 231.81, 316.1, 248/316.7, 230.8; 24/16 R, 275, 276, 20 R, 24/455, 457, 458
See application file for complete search history.

(56) References Cited

U.S. PATENT DOCUMENTS 3,252,677 A *   5/1966   Raymond ............... F16B 5/123
                                                            248/68.1
4,779,828 A     10/1988  Munch
(Continued)

FOREIGN PATENT DOCUMENTS

CN        1183527      6/1998
CN        101126469    2/2008
(Continued)

OTHER PUBLICATIONS

German Search Report mailed in German Application No. 10 2012 224 173.6 mailed Jan. 30, 2013.
(Continued)

*Primary Examiner* — Alfred J Wujciak
(74) *Attorney, Agent, or Firm* — RatnerPrestia (57) ABSTRACT

Fastening device for fixing at least one cable, wherein the fastening device includes a clip for receiving and/or fixing a cable, wherein the clip is designed such that it can at least partially surround the cable and clamp the cable in a force-fitting and/or interlocking manner, and wherein the fastening device has a fixing element which includes a guide element and a retaining element, wherein the guide element is mechanically connected to the clip, and the retaining element is designed such that it allows the fastening device to be mounted in a fixed position, wherein the guide element is mounted in the clip in a mount which at least partially surrounds the clip in respect of its casing surface.

10 Claims, 6 Drawing Sheets

(51) Int. Cl.
  *H02G 3/32* (2006.01)
  *H02G 3/00* (2006.01)
  *B60R 16/02* (2006.01)
  *F16L 3/127* (2006.01)
  *F16L 3/16* (2006.01)
  *F16L 3/123* (2006.01)

(52) U.S. Cl.
  CPC ............ *F16L 3/1058* (2013.01); *F16L 3/127* (2013.01); *F16L 3/16* (2013.01); *H02G 3/26* (2013.01); *H02G 3/32* (2013.01); *F16B 2/20* (2013.01); *F16L 3/123* (2013.01)

(56) References Cited

U.S. PATENT DOCUMENTS

| | | | |
|---|---|---|---|
| 5,564,672 A * | 10/1996 | Matson | F16L 3/1236 |
| | | | 24/16 PB |
| 5,836,367 A | 11/1998 | Calabrese | |
| 6,164,604 A | 12/2000 | Cirino | |
| 6,581,884 B1 | 6/2003 | Gretz | |
| 6,632,994 B1 * | 10/2003 | Mangone, Jr. | H02G 3/0487 |
| | | | 174/502 |
| 6,830,225 B2 | 12/2004 | Kato | |
| 7,503,528 B2 | 3/2009 | Adams | |
| 7,645,938 B2 | 1/2010 | Kogure | |
| 8,317,149 B2 * | 11/2012 | Greenburg | A61B 1/00128 |
| | | | 248/228.7 |
| 2009/0265895 A1 | 10/2009 | Box | |
| 2015/0322985 A1 * | 11/2015 | Scroggie | F16B 5/0084 |
| | | | 29/428 |

FOREIGN PATENT DOCUMENTS

| | | |
|---|---|---|
| DE | 924117 | 2/1955 |
| DE | 4123754 | 1/1993 |
| DE | 10318635 | 12/2003 |
| DE | 102007054501 | 5/2009 |
| EP | 0257367 | 3/1988 |
| FR | 2885671 | 11/2006 |
| GB | 2317936 | 4/1998 |
| WO | 9607829 | 3/1996 |
| WO | 2008054285 | 5/2008 |

OTHER PUBLICATIONS

International Search Report for International Application No. PCT/EP2013/063662 mailed Jul. 29, 2013.
Written Opinion of the International Searching Authority for International Application No. PCT/EP2013/063662.
Chinese Second Office Action mailed Apr. 22, 2016 for Chinese Application No. 201380035237.7, including English translation.

* cited by examiner

FASTENING DEVICE FOR FIXING A CABLE

CROSS REFERENCE TO RELATED APPLICATIONS

This application is the U.S. National Phase Application of PCT/EP2013/063662, filed Jun. 28, 2013, which claims priority to German Patent Application No. 10 2012 013 210.7, filed Jul. 4, 2012 and German Patent Application No. 10 2012 224 173.6, filed Dec. 21, 2012, the contents of such applications being incorporated by reference herein.

FIELD OF THE INVENTION

The invention relates to a fastening device for fixing a cable.

BACKGROUND OF THE INVENTION

The technical problem on which the invention is based When laying cables or flexible supply lines in a route-bound manner in space, said cables or flexible supply lines have to be fastened at fixing points. This is done either by fixing means (so-called brackets) on the main structure, said fixing means receiving a cable or flexible supply line, or fixing means which are fitted to the cable or flexible supply line and are connected to the main structure by means of a joining method. Rigid fixing means are usually fitted to cables or flexible supply lines. Said rigid fixing means are fixedly connected in a preliminary assembly process, so that the fixing means are axially rotated during the laying process on account of the route guidance. A separate fixing means is used for each type and situation of joining connection. The fixing means generally have several parts. During laying, the cable or the flexible supply lines have to be rotated into the appropriate joining position by applying force. The stresses introduced in this way continue from joining position to joining position, and adversely affect the laying rate and the accuracy of the route.

1. Prior Art

An attempt is made to follow the route as accurately as possible by axially orienting the fixing means during assembly. This involves a high level of expenditure on assembly and testing and therefore expense. Bearing points are fitted in a separate manufacturing process (injection-molding, shrink-fitting). Furthermore, annular fixing means which can be closed on one side and can freely rotate in the axial direction are mounted. This involves an additional manufacturing step and therefore expense. Changes in the position on the cable or the flexible supply line are associated with a high level of expenditure.

SUMMARY OF THE INVENTION

An aspect of the invention proposes a fastening device for fixing at least one cable, which fastening device is relatively inexpensive and/or reliable and/or allows improved or simple mounting of at least one cable and/or improves the fixing of the cable with respect to the flexible and, in this case, in particular defined orientation of the cable.

The fastening device according to an aspect of the invention for fixing at least one cable comprises, preferably, a clip for receiving and/or fixing a cable, wherein the clip is designed such that it can or does at least partially engage around the cable and can or does clamp said cable in a force-fitting and/or interlocking manner, and wherein the fastening device has a fixing element which comprises a guide element and a retaining element, wherein the guide element is mechanically connected to the clip, and the retaining element is designed such that it allows the fastening device to be mounted in a fixed position.

It is preferred for the guide element to be mounted in the clip in a mount which at least partially surrounds the clip with respect to its casing surface. This is to be understood to mean, in particular, that the guide element is mounted in the at least partially surrounding mount, of the clip itself.

It is expedient for the at least partially surrounding mount of the clip to have two grooves for mounting the guide element, said grooves being designed such that they each receive an edge or side of the guide element, and in particular wherein the grooves are each designed substantially along the curvature of the casing surface.

The guide element preferably has a panel which, or the base surface of which, is substantially in the form of a casing surface segment of a cylinder and/or in particular is designed to correspond to the curvature profile of the casing surface of the clip or is designed depending on said curvature profile.

It is preferred for the clip to be designed such that it can engage around a cable at least partially in a force-fitting manner and fix said cable, so that the cable is secured against rotation and displacement in the clip by the clip having retaining means, in particular retaining ribs, which can clamp the cable on its outer circumference.

The retaining means of the clip are expediently in the form of retaining ribs and/or retaining protrusions and/or retaining fins.

The retaining ribs of the clip are particularly preferably hollow and/or not solid and also elastic. The retaining ribs very particularly preferably have a wall thickness which is lower than one third or, in particular, one fifth of the average width of the retaining ribs or of the height of the retaining ribs.

It is expedient for the retaining ribs to be substantially trapezoidal with respect to their cross-sectional area and/or their profile, in particular the inwardly facing side surface of the retaining ribs, which is designed to mount the cable, is rounded, wherein the rounded portion is in the form of a recess in the top surface of the retaining ribs.

It is preferred for the clip to be of integral design, wherein it has two segments which are connected to one another on one side, in particular by means of a film hinge and/or by means of an elastic web, and wherein the other side can be folded open and folded closed and has an interlocking closure means.

The mount, comprising the two grooves, and also the guide element which is mounted in this mount are expediently designed such that relative movements along the curvature or the circumferential line of the casing surface of the clip between the clip itself and the fixing element are possible.

The inside diameter of the space spanned by the retaining ribs of the clip is preferably somewhat smaller than the outside diameter of the cable or flexible supply line which is to be received and clamped. Owing to the mechanical stress or force-fitting clamping generated as a result, a clamping action or an interlocking connection between the cable and retaining ribs is generated in particular, wherein the cable and retaining ribs are each slightly deformed. This prevents an axial relative movement or displacement between the cable and the clip.

Grooves which receive the semicircular mating segment of the variable fixing means by means of an undercut are expediently fitted on the first and second segments of the clip, in particular centrally or symmetrically with respect to the central cross-sectional area through the clip. Before the cable or the flexible supply line is deposited and the clip is folded closed, the guide element of the fixing element is placed or inserted into the mount which is formed by the grooves.

It is expedient for the at least one retaining element of the fixing element to be in the form of a tap or arrowhead or "Christmas tree". In this case, the retaining element is designed, in particular, such that it can be inserted into a recess or bore, particularly preferably in a vehicle body, and can be fastened and can be fixed therein.

The invention also relates to the use of the fastening device for fixing at least one cable in motor vehicles, in this case in particular for fixing the cable of a wheel rotation speed sensor to the vehicle body and/or to attached parts of the vehicle or the vehicle body.

BRIEF DESCRIPTION OF THE DRAWINGS

Further preferred embodiments can be found in the dependent claims and the following description of an exemplary embodiment, with reference to figures.

DETAILED DESCRIPTION OF THE PREFERRED EMBODIMENTS

Figure 1:
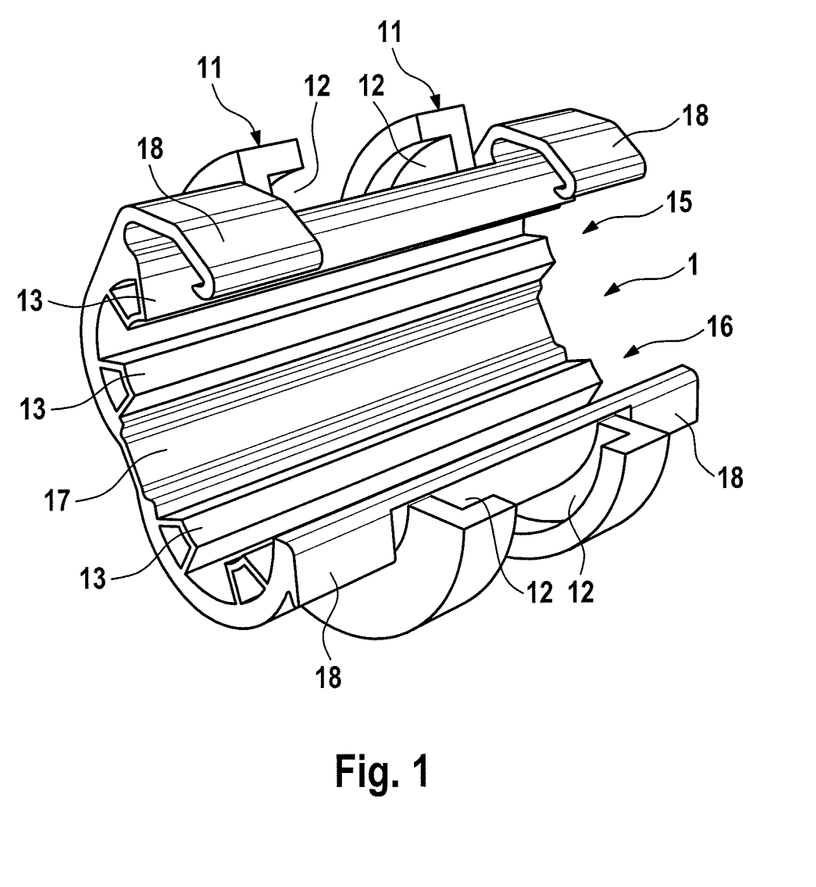
FIGS. 1 to 6 show schematic illustrations of an exemplary embodiment of the fastening device and the components of said fastening device.

FIG. 1 shows the clip 1 which has a first and a second segment 15, 16, which segments are connected to one another by means of a film hinge 17 or an elastic web. The clip has internal retaining ribs 13 which are designed to receive and mount and clamp a cable. In accordance with the example, the retaining ribs are hollow and have a defined wall thickness, so that the retaining ribs can act on the cable with a defined or definable retaining force. The clip 1 has two grooves 12 which form a mount which is designed such that it mounts the guide element of the fixing element, see FIG. 2, with respect to the casing surface of the clip in a manner at least partially surrounding said guide element.

Figure 2:
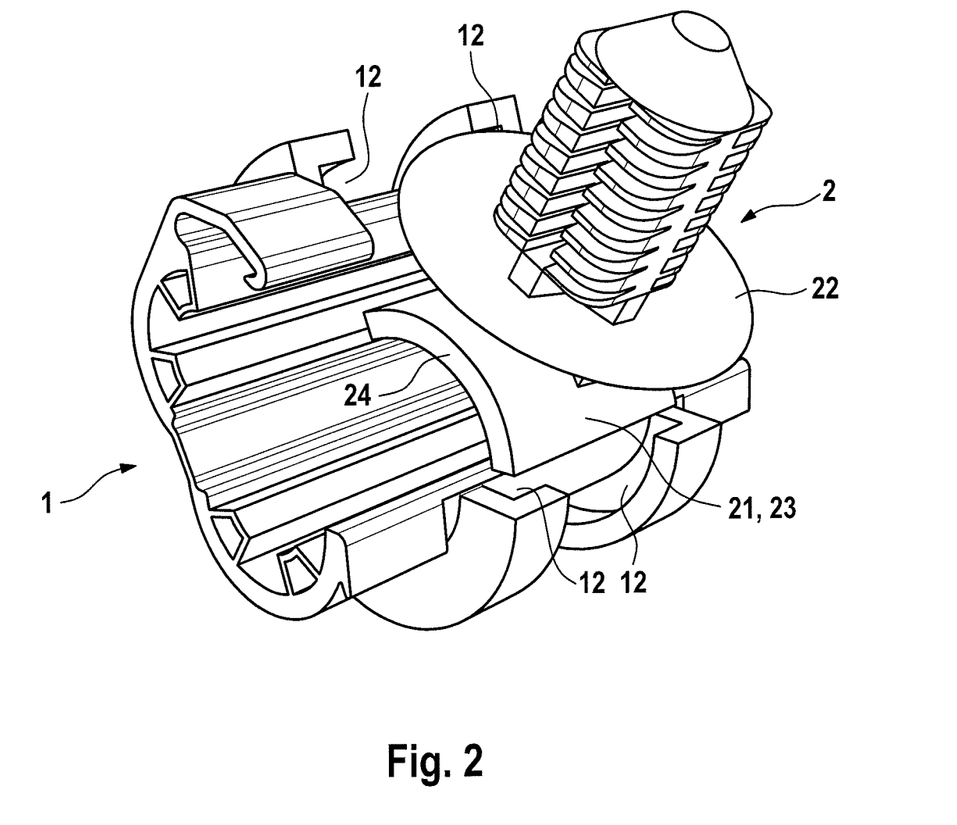

The mount 11, comprising the two grooves 12, and also the guide element which is mounted in this mount, see FIG. 2, are designed such that relative movements along the curvature or the circumferential line of the casing surface of the clip 1 between the clip itself and the fixing element are possible.

The clip 1 also comprises a closure means 18 which connects or can connect the two segments 15, 16 in an interlocking manner and closes or can close the clip, wherein the closure means is designed such that this closing operation takes the form of a linking operation and/or latching operation.

FIG. 2 shows the fixing element 2 which has the guide element 21 which comprises a panel 23. This guide element 21 is received by the two grooves 12 of the clip, which grooves form a mount and allow rotational relative movements between the clip 1 and the fixing element 2. In FIG. 2, the guide element 21 is not yet inserted into the two grooves 12 by way of its panel 23, but is illustrated in a position which occurs immediately before the guide element 21 enters the mount or is received by the two grooves 12.

Figure 3:
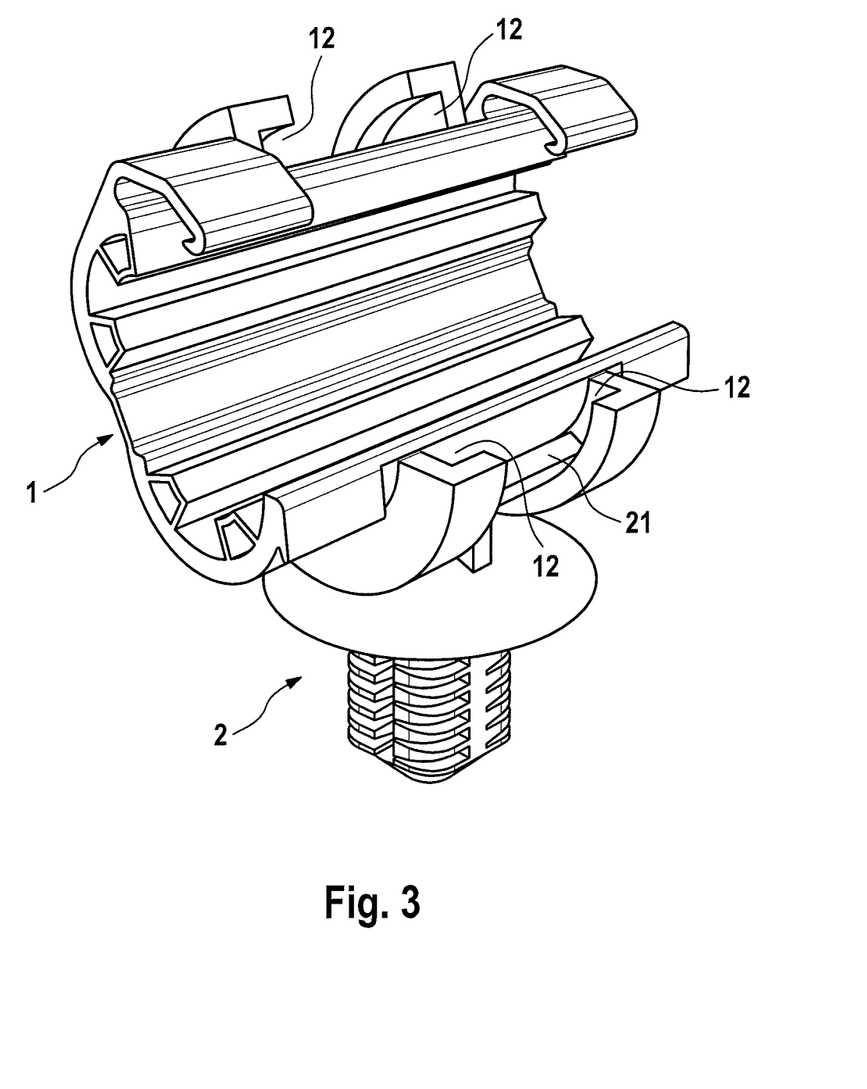

In FIG. 3, the guide element 21 of the fixing element 2 is received by the mount of the clip 1, that is to say the grooves 12 of said clip. According to the example, the fixing element is mounted by the grooves 12 of the clip 1 such that it can move in a rotary manner. The fixing element 2 is mechanically connected to the clip 1 and guided by means of this mount, with a degree of freedom along the curvature or the circumferential line of the casing surface of the clip 1.

Figure 4:
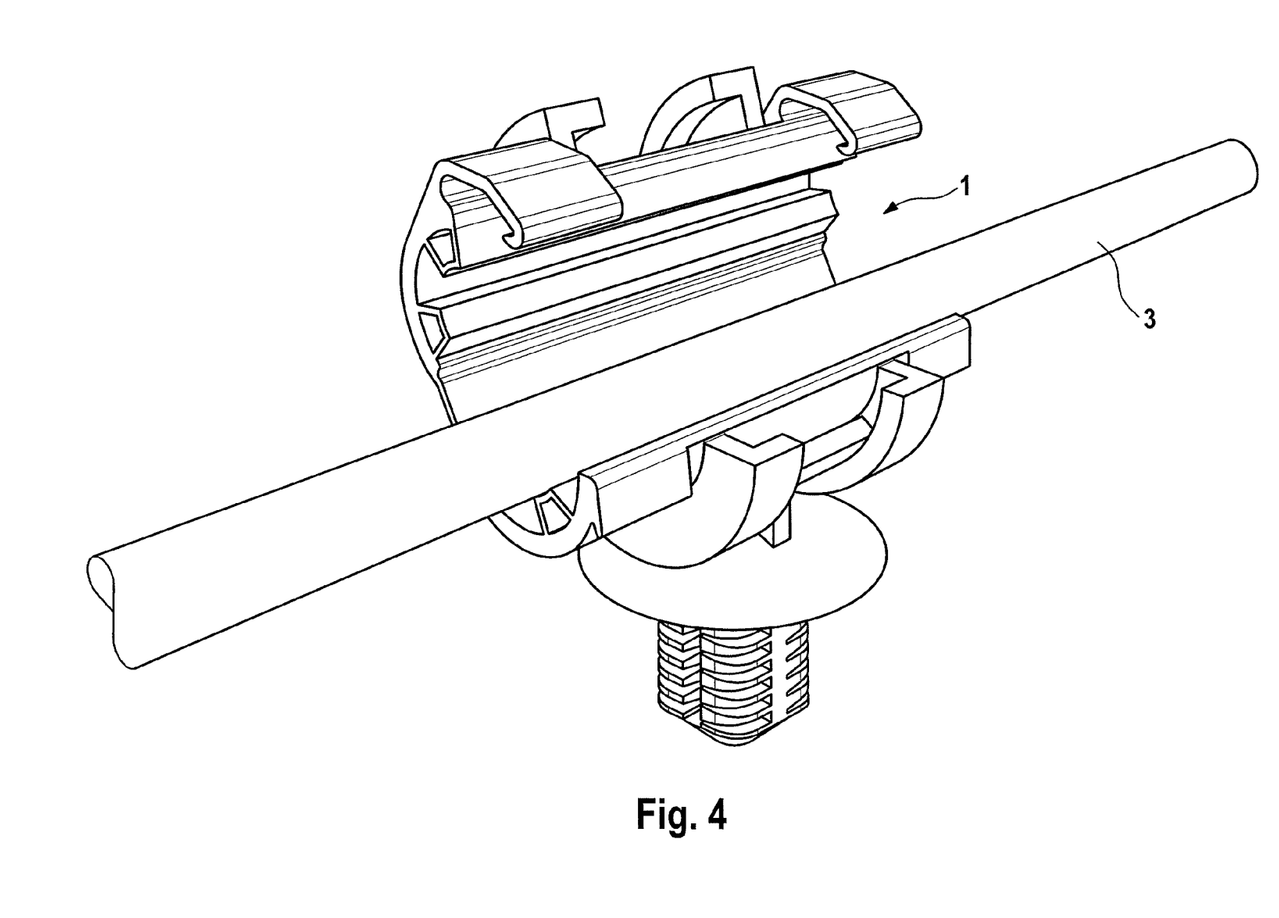

FIG. 4 shows a cable 3 which is placed into the clip 1.

Figure 5:
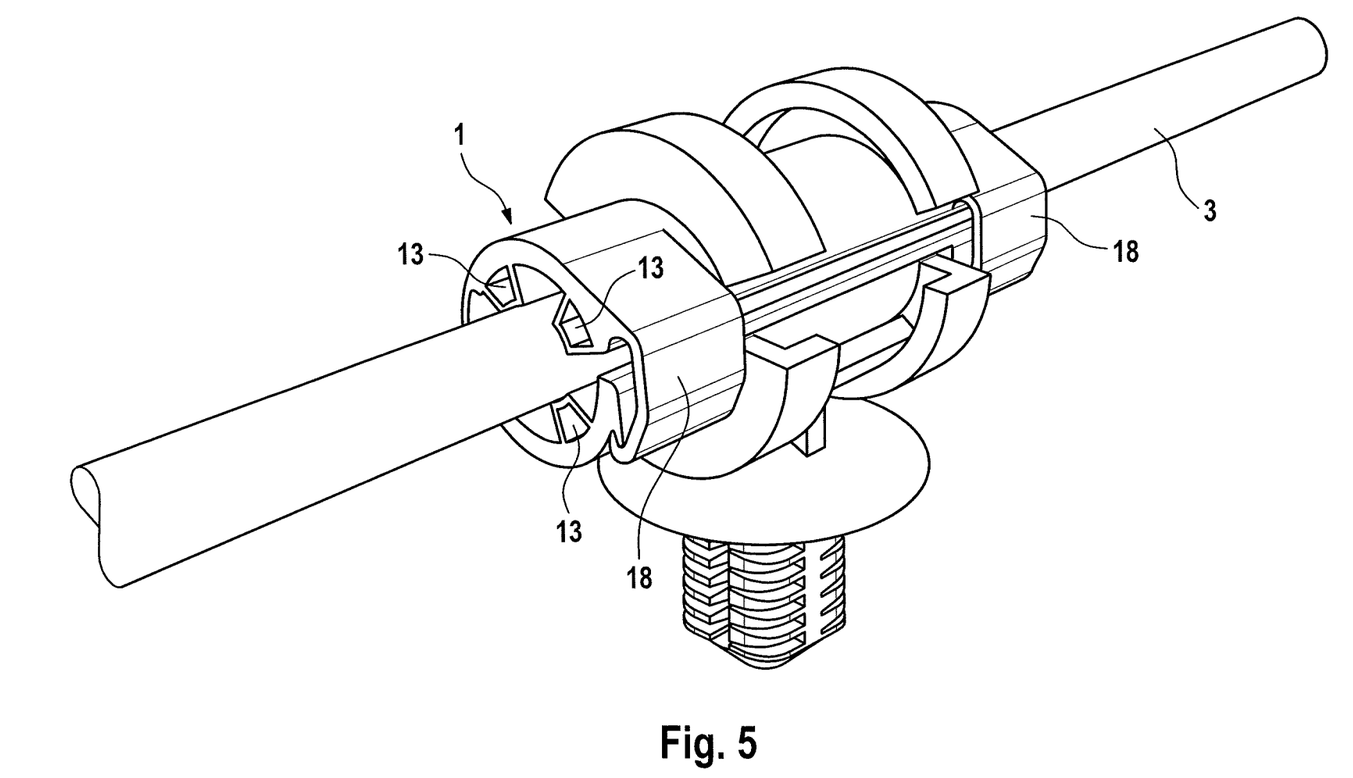

In FIG. 5, the fastening device is shown in the closed state such that it engages around and clamps a cable 3. In this case, the clip 1 is closed by means of the interlocking closure means 18. The cable 3 is mounted and firmly clamped by the retaining ribs 13. The clip 1 and the retaining ribs 13 are designed with respect to the cable 3 which is to be clamped such that the cable 3 is clamped in a force-fitting manner, this preventing rotation and displacement of the cable into or relative to the clip 1.

In this case, the retaining ribs 13 are elastically and/or plastically deformable according to the example, as a result of which the transmission of force to the cable or an adhesion fit of the cable on the retaining ribs 13 of the clip 1 is ensured or possible or implemented.

Figure 6:
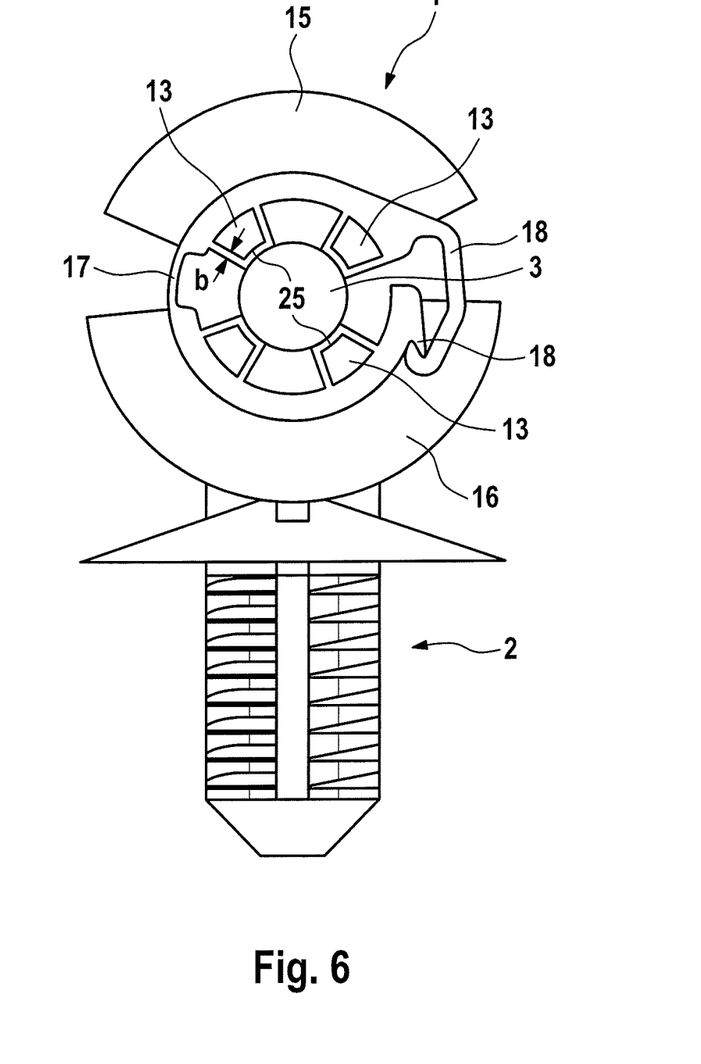

The fastening device is shown in a side view with an inserted or clamped cable 3 with reference to FIG. 6. The fastening device comprises the clip 1 and the fixing element 2. The clip 1 is closed. The two segments 15 and 16 are connected in an integral manner on one side by means of the film hinge and are connected in an interlocking manner on the other side by means of the closure means 18. The side view shows retaining ribs 13 which, according to the example, have a substantially trapezoidal cross-sectional area or a profile of this kind. In this case, the retaining ribs 13 are hollow and have a wall thickness b which is lower than one fifth of the average width of the retaining ribs. The inwardly facing side surface 25 of the retaining ribs, which in each case mounts the cable 3, is rounded by way of example, wherein the rounded portion is in the form of a recess or is in the form of a concave rounded portion or is substantially matched or approximated to the outer casing of the cable 3.

The invention claimed is:

1. A fastening device for fixing at least one cable, wherein the fastening device comprises a clip for receiving and/or fixing the at least one cable, wherein the clip is designed such that it can at least partially engage around the cable and can clamp said cable in a force-fitting and/or interlocking manner, and wherein the fastening device has a fixing element which comprises a guide element and a retaining element, wherein the guide element is mechanically connected to the clip, and the retaining element is designed such that it allows the fastening device to be mounted in a fixed position, wherein the guide element is mounted in the clip in a mount which at least partially surrounds the clip with respect to a circumferential surface of the clip, the guide element mounted so as to be rotatably movable within the mount in a circumferential direction of the at least one cable, and wherein the at least partially surrounding mount of the clip has two grooves for mounting the guide element, said grooves being designed such that they each receive an edge or side of the guide element, and wherein the grooves are each designed substantially along a curvature of the circumferential surface of the clip.

2. The fastening device as claimed in claim 1, wherein the guide element has a panel which is substantially in the form of a segment of a cylinder and/or is designed to correspond to a curvature profile of the circumferential surface of the clip or is designed depending on said curvature profile.

3. The fastening device as claimed in claim 1, wherein the clip is designed such that it can engage around the cable at least partially in a force-fitting manner and fix said cable, so that the cable is secured against rotation and displacement in the clip by the clip having retaining means which can clamp the cable at its outer circumference.

4. The fastening device as claimed in claim 3, wherein the retaining means of the clip are in the form of retaining ribs and/or in the form of retaining protrusions and/or in the form of retaining fins.

5. The fastening device as claimed in claim 4, wherein the retaining ribs of the clip are hollow and elastic.

6. The fastening device as claimed in claim 5, wherein the retaining ribs have a wall thickness (b) which is lower than one third or one fifth of an average width of the retaining ribs or of a height of the retaining ribs.

7. The fastening device as claimed in claim 1, wherein the retaining element of the fixing element is in the form of a tap or arrowhead.

8. A fastening device for fixing at least one cable, wherein the fastening device comprises a clip for receiving and/or fixing the at least one cable, wherein the clip is designed such that it can at least partially engage around the cable and can clamp said cable in a force-fitting and/or interlocking manner, and wherein the fastening device has a fixing element which comprises a guide element and a retaining element wherein the guide element is mechanically connected to the clip, and the retaining element is designed such that it allows the fastening device to be mounted in a fixed position, wherein the guide element is mounted in the clip in a mount which at least partially surrounds the clip with respect to a circumferential surface of the clip, the guide element mounted so as to be rotatably movable within the mount in a circumferential direction of the at least one cable, wherein the clip has retaining ribs which are substantially trapezoidal with respect to their cross-sectional area and/or their profile which is designed to mount the cable, is rounded, wherein the rounded portion is in the form of a recess in the top surface of the retaining ribs.

9. The fastening device as claimed in claim 8, wherein an inwardly facing side surface of the retaining ribs are substantially trapezoidal with respect to their cross-sectional area and/or their profile.

10. A fastening device for fixing at least one cable, wherein the fastening device comprises a clip for receiving and/or fixing the at least one cable, wherein the clip is designed such that it can at least partially engage around the cable and can clamp said cable in a force-fitting and/or interlocking manner, and wherein the fastening device has a fixing element which comprises a guide element and a retaining element, wherein the guide element is mechanically connected to the clip, and the retaining element is designed such that it allows the fastening device to be mounted in a fixed position, wherein the guide element is mounted in the clip in a mount which at least partially surrounds the clip with respect to a circumferential surface of the clip, the guide element mounted so as to be rotatably movable within the mount in a circumferential direction of the at least one cable, wherein the clip is of integral design, wherein it has two segments which are connected to one another on one side, by a film hinge and/or by an elastic web, and wherein the other side can be folded open and folded closed and has an interlocking closure means.

* * * * *